US006820444B1

(12) United States Patent
Birchard

(10) Patent No.: US 6,820,444 B1
(45) Date of Patent: Nov. 23, 2004

(54) METHOD AND APPARATUS FOR FORMING GLASS COILED TUBE

(76) Inventor: Thomas R. Birchard, 910 Rd. 20, Madison, KS (US) 66860-8910

( * ) Notice: Subject to any disclaimer, the term of this patent is extended or adjusted under 35 U.S.C. 154(b) by 0 days.

(21) Appl. No.: 09/718,004

(22) Filed: Nov. 21, 2000

Related U.S. Application Data

(60) Provisional application No. 60/167,181, filed on Nov. 23, 1999.

(51) Int. Cl.[7] .............................................. C03B 23/06
(52) U.S. Cl. .............................. 65/281; 65/109; 65/276
(58) Field of Search ........................ 65/108, 109, 276, 65/278, DIG. 9, 281

(56) References Cited

U.S. PATENT DOCUMENTS 2,296,321 A * 9/1942 Wellech 2,545,271 A * 3/1951 Gartner ........................ 65/188

FOREIGN PATENT DOCUMENTS

AT 107928 * 11/1927 ................... 65/108

* cited by examiner

*Primary Examiner*—Sean Vincent
(74) *Attorney, Agent, or Firm*—Bruce J. Clark

(57) ABSTRACT

An apparatus for forming glass coiled tubes from a source of glass in which a molten glass thread is drawn, and a method for forming glass coiled tubes. The apparatus has a shaping mandrel having a first end and an opposing second end, having a desired shape for receiving around it the molten glass thread such that when the thread is drawn about the desired shape, a formed coil is developed that essentially takes a desired shape from the shaping mandrel; a block simultaneously applies the newly formed coil to the back of the formed tube and moves the formed tube in a direction towards the second end in response to the additional molten glass thread drawn to the coil; a hook engages the molten glass thread and a rotating motor rotates the hook.

10 Claims, 4 Drawing Sheets

METHOD AND APPARATUS FOR FORMING GLASS COILED TUBE

This application claims the benefit of U.S. Provisional Application No. 60/167,181 filed Nov. 23, 1999.

BACKGROUND OF INVENTION:

The present invention relates to the field of making glass coiled tubes. Glass coiled tubes can be used for a variety of purposes. The present invention is particularly suitable for making glass coiled tubes that can be used not only for a variety of purposes, but are themselves unique decorative glass beads, or can be cut and finished to make unique decorative glass beads. Glass coils, particular those for making beads, are generally wound on a mandrel by hand, one at a time. This is a slow process that requires a slow rate of turning of the mandrel, allows for only one bead at a time to be created, and requires a considerable degree of advanced skill to achieve any degree of acceptable uniformity. Consequently the process is slow, tedious and adapted more for only the most skilled of glass artists.

Another method used is the drawn method where basically the glass is melted, a bubble is blown, and the bubble is then drawn into an elongated tube at the desired length, which tube is then cut into smaller portions to create beads.

Gartner, U.S. Pat. No. 2,545,271, discloses a glass coiling apparatus with a cooling mechanism and a complicated arrangement of moving parts, all for the purpose of creating glass helices having separated glass coils. Gartner in fact teaches to separate the glass coils, just the opposite of what the present invention is designed primarily to do, i.e. to create an elongated continuously fused substantially uniform glass coil tube. Gartner is not only complicated, but also creates the tube in an entirely different manner by moving the glass helix along with an independent wheel directly contacting the surface of the glass from the side.

Wellech, U.S. Pat. No. 2,296,321, likewise discloses a complicated apparatus with numerous moving parts. Like Gartner, it teaches to separate the coils and has an independent wheel to move the helix and at the same time to draw the glass from the molten glass source. Both Gartner and Wellech, although on the face creating glass tubes, do so in an opposite manner from the present invention, with a complicated machine of moving parts.

The present invention, while requiring some degree of skill to create the desired glass bead, provides an apparatus and method for creating elongated glass coiled tubes at a speed of 700 to 800 rpm in the preferred mode. These glass tubes can, if kept short, be the beads themselves or can be cut into, as the process describes, smaller glass beads. Moreover, it does not require blowing a bubble to do so. It allows for creation of unique designs of glass coiled tubes and beads at a faster pace; further allows for a process that provides operator control over formation of the beads and their appearance, but at a relatively fast pace; it further provides a method and apparatus for creating tubes of glass and/or beads of relative uniformity with the ability to substantially recreate the same design, and to do so at a relatively fast pace. Moreover, although it allows for relative uniformity in the creation of the coils and beads, some slight variation is allowed which renders the beads and coils uniquely adapted for artistic purposes. It also provides a glass tube, coil, or bead, where it is desired to have the individual glass coils as visible elements of the end product. It is still the further object of the invention to create such an apparatus that is inexpensive to build and to create such a process that is relatively easy to learn and master so as to allow for mass production of substantially hand crafted coils and beads. It is thus the further object of the invention to create a simple process and apparatus that alleviates the need for cooling apparatus and minimizes the need for moving parts. Consequently it will be seen that these objectives are met with the present invention as described herein.

Other objects and features of the invention and the manner in which the invention achieves its purpose will be appreciated from the foregoing and the following description and the accompanying drawings which exemplify the invention, it being understood that changes may be made in the specific method and apparatus disclosed herein without departing from the essentials of the invention set forth in the appended claims.

DESCRIPTION OF THE PREFERRED EMBODIMENTS

Figure 1:
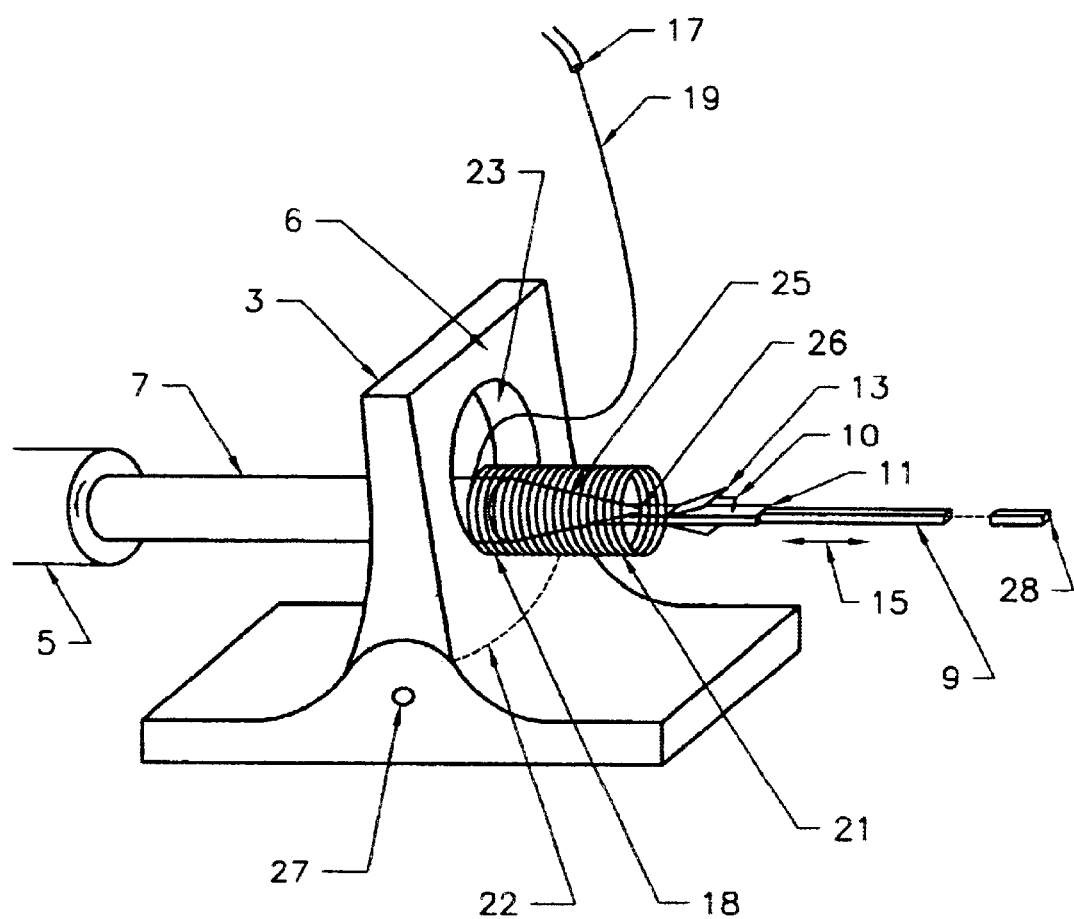
FIG. 1 is a perspective view of the apparatus with the glass in place.
Figure 2A:
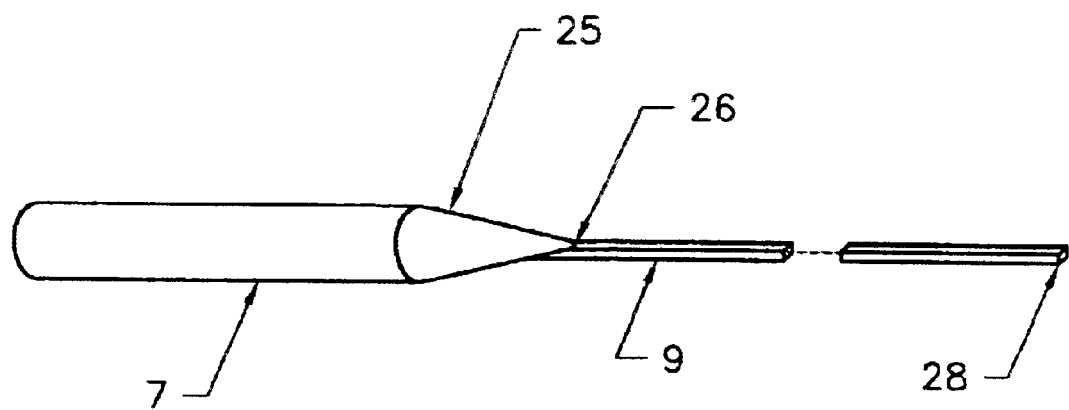
FIG. 2a is a perspective view of the mandrel portion of the apparatus with the stabilizing bar.
Figure 2B:
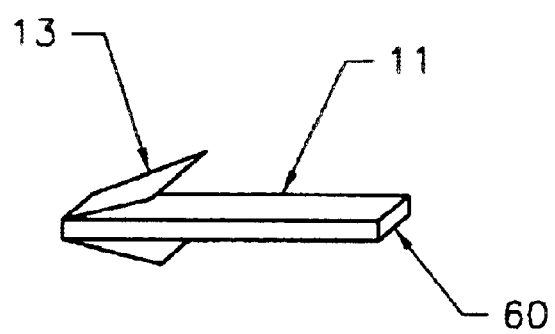
FIG. 2b is a perspective view of the hook portion of the apparatus showing hollow portion 60 through which the stabilizing bar extends.

The apparatus in the preferred mode is shown in FIG. 1. The shaping mandrel 7 is connected to a variable speed rotating means such as a motor or hand drill for providing rotational force, which motor is secured to the working table. The shaping mandrel 7 is essentially an elongated rigid member having two ends, the first of which is removably connected to the motor 5, and the second end, in the preferred mode, is in the form of a conical shape 25 having endpoint 26 at the opposing end of the first end. This second end is affixed to the stabilizing bar at 26 which itself, in the preferred mode, is a flattened elongated rigid member having a first end at 26, and a second end 28 which end is extended far enough to hold the desired length of cooled glass tube. In the preferred mode the length of the stabilizing bar is approximately 8 to 12 inches although a much longer length is also envisioned. Block 3 is pivotally connected to base member 1 at 27 and has hole 23 through which the shaping mandrel 7 protrudes. In the preferred mode the location of the mandrel along the imaginary longitudinal axis created by the shaping member—stabilizing bar combination is such that the base of the conical section 25 just begins extending out of the front face 22 of the block. By frame of reference, on the imaginary longitudinal axis of the shaping mandrel stabilizing bar combination, the drive end refers to that end of the shaping mandrel—stabilizing bar nearest the drill, and the opposing end 28 is referred to as the free end. Consequently it will be seen that the glass coil is formed and moves from the drive end towards the free end. The block 3 has a top end 6 and a base end 22 and is tilted such that the top end 6 is closer to the drive end and the base end is closer to the free end. The shaping mandrel, in the preferred mode, controls the block near the lateral drive point 18. The foregoing creates an angle that requires the hole 23 to be elongated so as to be able to freely receive the shaping mandrel—stabilizing bar. It also allows the glass thread 19 to be fed from behind (nearer the drive end) the lateral drive point 18. This lateral drive point is the approximate area where the glass thread not only makes contact with the block, but is where the angle and position of the block are such that the block causes a forward lateral movement of the glass and spiral towards the free end as additional glass material is fed to that point. In other words, the lateral drive point acts as the point at which the rotational or feeding directional movement of the thread is transferred to a lateral movement towards the free end. The angle of the block not only provides the lateral drive force for the glass, but also assists in allowing the glass thread to take the shape of the shaping mandrel. For example, it will be seen that other shapes of the shaping mandrel can be utilized, such as a square shape, as opposed to the conical shape described. If the angle of the block is straight up and down with respect to the imaginary axis, thus creating an essentially 90 degree angle, not only is the lateral drive force minimized, the thread of the glass has far less tendency to take the shape of the shaping mandrel. In other words, if the angle of the block is adjusted utilizing adjustment means at 27, such that the top end 6 is closer to the drive end, the glass thread will more closely take the shape of the shaping mandrel.

Hook 11 is slidably attached to the stabilizing bar 9 such that it slides in a lateral direction 15. It has at least one wing 13 for catching the end of the glass thread to begin the forming of the glass spiral when the stabilizing bar and hook are turned in response to the drill motion. Consequently it will be seen that the shape of the stabilizing bar acts to turn the hook and the two are connected so as to allow the hook to turn with the stabilizing bar yet slidably move thereon.

To create the spiral or glass beads, first, the thread is pulled from the molten glass source 17 and drawn around the wing 13 with the hook 11 in place adjacent to the block. The motor 5 is engaged to rotate the mandrel in a direction away from the side on which the glass source is located. The motor and speed are adjustable by way of an electrically connected foot pedal so as to allow the hands to remain free to work the glass. In the preferred mode the motor operates at approximately 700 to 800 RPM, however, a variety of speeds are envisioned. While the motor is engaged and turning, the shaping mandrel, the glass source and thread are maintained so as to be behind (towards the drive end), the lateral drive point 18. Rotational movement of the motor continues while the glass remains plastic (in a molten state) until the desired length of coil is achieved or until the glass is no longer plastic as a result of cooling. While the shaping mandrel turns and creates continuous coil after coil, the coil structure is automatically forced laterally towards the free end, and each of the individual adjacent coils adhere to each other while in the plastic state, creating a continuous glass spiral tube. Thus, the shaping mandrel, as the plastic thread wraps around the same, helps to create a desired effect; consequently by changing the shaping mandrel to a square or other shape, different effects and appearances of the spiral can be achieved. To achieve other shapes, the thread can also be shaped by the operator as the operator is feeding the thread. The lateral resistance provided by the friction between the hook and the stabilizing bar can be achieved and adjusted by simply squeezing with pliers the hook to tighten it against the stabilizing bar, so as to provide sufficient resistance, if against the otherwise laterally free movement of the glass coil for the purpose of assuring that successive winds of the coil maintain contact and adherence with each other. This can also be achieved by utilizing an adjustable screw 10 that tightens the hook to the stabilizing rod 3. The amount of resistance, is varied significantly, achieves different effects.

Upon the glass cooling, the tubes, if not of the desired length, can then be cut to the desired rough bead length using a diamond saw or other glass cutting device to produce a uniform square end. A cane cutter can also be used. When the diamond saw is used the result is a nice square end. If the cane cutter is used the result is more or less perpendicular break through the coil at the end of the section of tubing.

The rough beads are then cold finished by grinding the rough edges with abrasives to shape and polish the bead.

If the tubes are cut into lengths with a diamond saw the rough cut beads are washed to remove any debris left from the cutting process. Then they must be dried to remove water before they are placed on the kiln shelf. The kiln shelf has a layer of kiln wash applied to it to keep the glass from sticking when the beads melt at temperature. This kiln wash (basically a high temperature powdered ceramic material) tends to stick to the bottom of the beads if water from the washing step is not removed before the beads are placed on the kiln shelf. It is desirable to remove any debris and water if the beads are to be finished with a torch. Undesirable debris is not present after cutting the tubes with a cane cutter.

The process for kiln finishing the beads then continues by the placing of the rough beads on end on the kiln shelf with enough space between them so that they will not contact each other during the melting process. The kiln shelf is placed in the kiln after the rough beads have been placed thereon and the temperature of the kiln is brought to above 1200F. to begin melting the glass. As the melting progresses the top of the beads draw in leaving the tube with a smaller inside and outside diameter than bottom which has more resistance to this effect because of contact with the kiln shelf.

The beads also slump down because of gravity and the coils melt together leaving them less defined but more resilient.

The process of melting is halted by the operator at the desired moment by turning off and venting the kiln and thus lowering the temperature below the melting point of the glass (appox. 1200F.). The desired moment being, in the preferred mode, when the hole size is correct for the desired application of the bead.

At this point the bead has been formed by melting and the force of gravity into a conical shape. The beads are then cooled sufficiently to be flipped over so they are then standing on what was their top.

The process of melting is the repeated. During this final melting step the beads close in at the top producing a relatively uniform shaped cylinder. After the desired shape of the beads has been achieved the operator vents the kiln to quickly lower the temperature in the kiln to a point below 1200F. to stop the melting process.

It is desirable to bring the temperature down to the annealing temperature (900F.) at this point. The beads are then soaked at this annealing temperature for necessary time, depending on the thickness of the glass, to relieve and prevent stress in the finished glass beads.

The beads are then allowed to cool at a natural rate with the kiln closed. Typically the kiln is turned off and not opened until it is near room temperature after the annealing process is complete. This prevents any thermal shock to beads when the beads have been cleaned of any kiln wash the process is complete. This is usually a matter of wiping them off.

An alternative method of finishing involves using a hand torch to melt and shape the ends of the glass cylinder. The cylinders are gradually heated to the point where they can be worked with a torch. It is important to heat the glass in a uniform manner while bringing the temperature up in order to avoid shattering the glass. Once the glass is sufficiently hot to work, the ends of the cylinders are heated to the point of being molten. They then become smooth and close in around the hollow center. The torch is withdrawn when the desired hole size has been achieved allowing the glass to cool and halt the effect. The cylinder is then flipped and the other end is finished the same way. The beads are then properly annealed to complete the process.

The beads need to placed in an annealing kiln as soon as they are cool enough to be picked up with tweezers without marking them after they have been finished with a torch. This is at a temperature of about 1000F. The beads are then soaked at this annealing temperature for necessary time, depending on the thickness of the glass, to relieve and prevent stress in the finished glass beads.

The kiln is cooled as described before after proper annealing. This completes the process.

Figure 3:
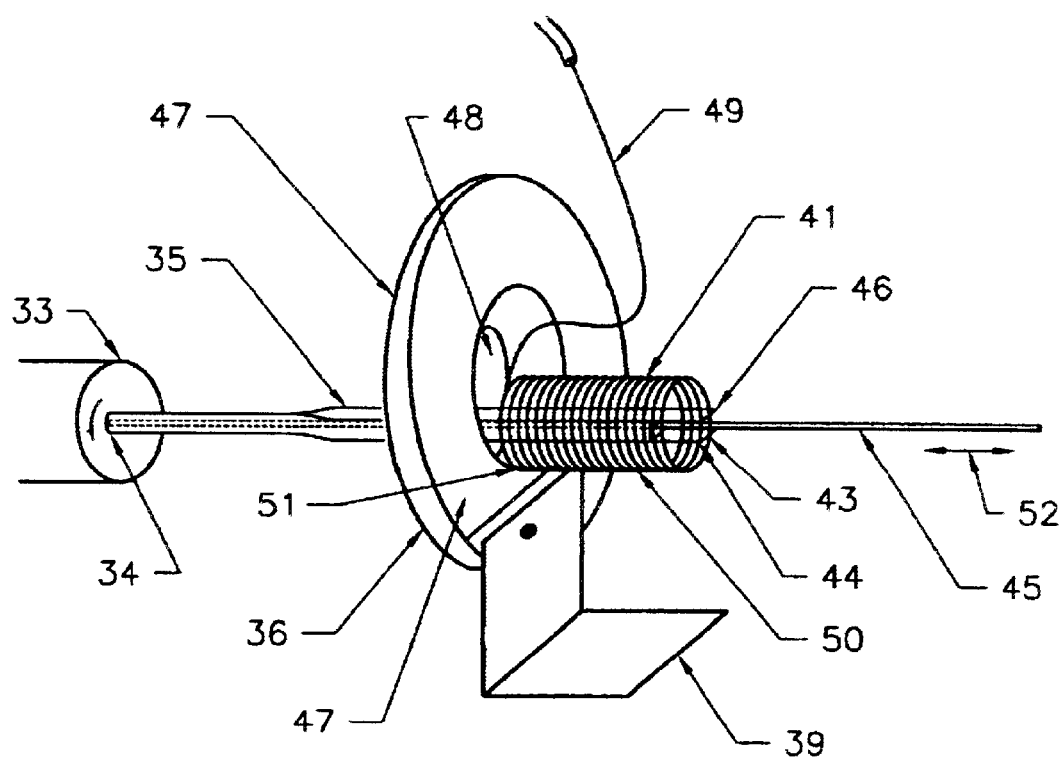
FIG. 3 is a perspective view of an alternative view of the invention with the glass.
Figure 4:
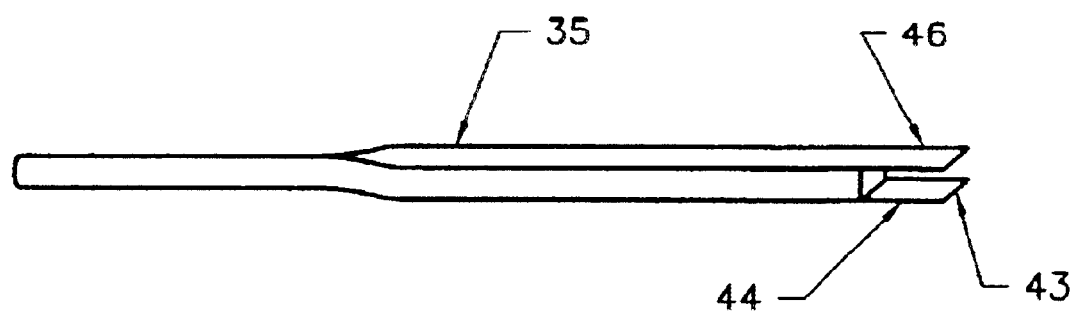
FIG. 4 is a perspective view of the mandrel in the alternative mode of the apparatus.

In an alternative mode of the invention, FIG. 3, the mandrel 35 has a first end 34 removably attached to rotating drive means 33 and has a second end 43. In this mode of the invention, the mandrel has an elongated square shape, although it could be in a triangle or rectangle shape as viewed from the end. This mode of the invention shown in FIG. 3 is more suitable for utilizing the square, triangle and rectangle mandrel shapes and less suitable for the cylindrical shaped mandrel shown in FIG. 1.

More particular the square shape mandrel 35 has at its second end at least one (two, 44 and 46 are shown) extension so as to act as a hook, or grabbins means, for the initial thread of glass to begin the operation. Although it is not absolutely necessary, the mandrel 35 is shown hollow throughout, capable of receiving the elongated stabilizing bar 45 which functions similarly to stabilizing bar 9 in FIG. 1, however, stabilizing bar 45 is, in the preferred mode, a simple elongated essentially cylindrical rod shape as opposed to the flattened stabilizing bar 9 in FIG. 1. The mandrel 35 protrudes through hole 48 in block 37, which like block 6 in FIG. 1 is comprised of graphite or other material nonconducive to the glass attaching. Copper and brass also suffice, although graphite provides a better lubricating effect. Graphite also wears more requiring replacement of the graphite block more frequently. Platinum is also envisioned to provide a durable, nonstick surface.

The block 37 is placed at an angle or has an angled face 47 so that the face is not at a right angle with respect to the lateral direction of movement 52. This allows the glass thread 49 to be fed from behind the lateral drive point 51 at which point the thread makes primary contact with the block. The molten glass thread conforming to the shape of the angular mandrel creates the pulling, i.e. drawing force, to pull the glass from the source, much as the hook does in the first mode of the invention. Therefore the glass hook Thus the rotational drive means 33 turns the mandrel 35 which in turn causes the accumulated gathering of the glass thread in the coiled form 41. The glass coil is pushed off of the second end of the mandrel on to the stabilizing bar as the glass material continues to be fed into, accumulate and formed at the lateral drive point. The block 37 is held in place on the table or working surface utilizing securing means 39, such as angle iron 39. The hole 48 in the block 37 is large enough for the mandrel to easily rotate within and with a minimum of friction.

This alternative version is used simply by first selecting the desired mandrel such as a rectangular, triangular or square shape, sliding it onto the stabilizing bar and securing the first end to the rotating drive means. The glass is then melted and a thread is drawn, the end of which is attached to either of the hook members 44 or 46; the rotating drive means is then turned utilizing a foot pedal control means to turn the mandrel so that, in the preferred mode, the glass thread feeds from over the top side of the mandrel while the mandrel rotates away causing a pulling motion on the glass thread 49. Lateral resistance is provided by both the friction between the glass coils and the mandrel and by adjusting the hooks 44 and 46. By spreading these hooks out somewhat, additional resistance is provided. This resistance assures that as the glass thread 49 comes off of the lateral drive point 51, enough of the glass coil remains in place so as to assure a connection with the next incremental piece of glass thread material so as to assure that the individual glass coils are connected to each other. By changing the resistance, additional and unique characteristics can be achieved. The mandrel is continuously rotated until the desired length of coil is achieved or until the glass thread cools. The coils are then finished, or cut into smaller pieces and finished, as set forth above in the first embodiment.

While there have been shown and described particular embodiments of the invention, it will be obvious to those skilled in the art that changes and modifications may be made without departing from the invention or its equivalent, and, therefore, it is intended by the appended claims to cover all such changes and modifications as fall within the true spirit and scope of the invention.

I claim:

1. An apparatus for forming glass coiled tubes from a source of glass from which a molten glass thread is drawn, comprised of:

a. A shaping mandrel having a first end and an opposing second end, said mandrel having an essentially conical shape near the second end for receiving around it the molten glass thread such that when the thread is drawn about the mandrel, a formed coil is developed that essentially takes a desired shape from the shaping mandrel;

b. A stationary block having an angular face causing movement of the formed coil in a direction towards the second end in direct response to additional molten glass thread drawn to the coil;

c. Attachment means for first engaging the molten glass thread;

d. Variable rotating means for rotating the attachment means.

2. An apparatus for forming glass coiled tubes from a source of glass from which a molten glass thread is drawn, comprised of:

a. A shaping mandrel having a first end and an opposing second end, said mandrel having an essentially conical shape near the second end for receiving around the mandrel the molten glass thread such that when the thread is drawn about the mandrel a formed coil is developed that essentially takes a desired shape from the shaping mandrel;

b. A block for redirecting the formed coil at a point on the blade defining a lateral drive point so as to cause the formed coil to move without other external means towards the mandrel second end, and where the block is positioned in a manner such that the lateral drive point is positioned between the second end of the mandrel and the direction from which the molten glass thread is fed with respect to the shaping mandrel so as to allow the molten glass thread fed from a direction behind the lateral drive point, nearest the mandrel first end, c. Attachment means for first engaging the molten glass thread;

d. Variable rotating means for rotating the attachment means.

3. The glass forming apparatus in claim 1 having an elongated stabilizing bar attached to the second end of the mandrel near at the end of the conical portion and of sufficient length to support the desired length of the formed glass coil, said stabilizing bar having a first end adjacent to the second end of the mandrel and having a second end opposing the first end.

4. The glass coil forming apparatus in claim 3 wherein the attachment means is slidably engaged with the stabilizing bar.

5. The glass coil forming apparatus in claim 4 wherein the attachment means has tension adjusting means thereon to vary the tension between the attachment means and the stabilizing bar.

6. The glass coil forming apparatus in claim 1 having means for adjusting the resistance to the movement of the formed coil.

7. The glass coil forming apparatus in claim 2 wherein the block has an essentially planar face upon which the lateral drive point exists and wherein the block planar face is angled with respect to the direction of the movement of formed glass coil.

8. The glass coil forming apparatus in claim 1 wherein the block has an opening through which the shaping mandrel protrudes.

9. The glass coil forming apparatus in claim 1 wherein the attachment means is attached to the second end of the shaping mandrel.

10. The glass coil forming apparatus in claim 9 having an elongated stabilizing bar having a first end and a second end connected so as to allow the formed glass coil to move on to the stabilizing bar.

* * * * *